(12) United States Patent
Davis et al.

(10) Patent No.: US 8,068,882 B2
(45) Date of Patent: Nov. 29, 2011

(54) PORTABLE MEDIA PLAYER EMULATOR FOR FACILITATING WIRELESS USE OF AN ACCESSORY

(75) Inventors: Keith Robert Davis, Stroudsburg, PA (US); David Brian Zepp, Milford, PA (US); Eric Aaron Langberg, Milford, PA (US)

(73) Assignee: Plantronics, Inc., Santa Cruz, CA (US)

( * ) Notice: Subject to any disclaimer, the term of this patent is extended or adjusted under 35 U.S.C. 154(b) by 1317 days.

(21) Appl. No.: 11/412,101

(22) Filed: Apr. 27, 2006

(65) Prior Publication Data

US 2007/0254695 A1 Nov. 1, 2007

(51) Int. Cl.
*H04M 1/00* (2006.01)
(52) U.S. Cl. .......... 455/569.1; 455/569.2; 455/41.2; 455/556.1; 455/90.3; 381/300; 381/302; 381/309; 381/311
(58) Field of Classification Search .......... 455/3.06, 455/556.1, 41.2–41.3, 557, 569.1, 573, 567, 455/575.2, 558, 418–420, 553.1, 410–411; 381/300, 302, 309, 311
See application file for complete search history.

(56) References Cited

U.S. PATENT DOCUMENTS

| | | | |
|---|---|---|---|
| 7,660,602 B2* | 2/2010 | Berman et al. | 455/556.1 |
| 2003/0059038 A1* | 3/2003 | Meyerson et al. | 379/428.04 |
| 2003/0088879 A1 | 5/2003 | Martinez et al. | |
| 2003/0125075 A1* | 7/2003 | Klovborg | 455/556 |
| 2004/0224638 A1 | 11/2004 | Fadell et al. | |
| 2004/0234088 A1 | 11/2004 | McCarty et al. | |
| 2005/0096018 A1* | 5/2005 | White et al. | 455/414.1 |
| 2005/0244025 A1* | 11/2005 | Schul et al. | 381/334 |
| 2005/0245191 A1* | 11/2005 | Falcon | 455/3.06 |
| 2005/0287958 A1* | 12/2005 | Sheng et al. | 455/88 |
| 2006/0046656 A1* | 3/2006 | Yang | 455/41.3 |
| 2006/0052144 A1* | 3/2006 | Seil et al. | 455/575.1 |
| 2006/0127034 A1* | 6/2006 | Brooking et al. | 386/46 |
| 2006/0229110 A1* | 10/2006 | Tsai | 455/569.2 |
| 2007/0026908 A1* | 2/2007 | Chen | 455/575.2 |
| 2007/0055396 A1 | 3/2007 | Hedges et al. | |
| 2007/0076911 A1* | 4/2007 | Schul et al. | 381/334 |
| 2007/0149247 A1* | 6/2007 | Wong | 455/557 |
| 2007/0155358 A1 | 7/2007 | Krieger et al. | |
| 2007/0223725 A1 | 9/2007 | Neumann et al. | |
| 2007/0247794 A1* | 10/2007 | Jaffe et al. | 361/681 |
| 2008/0090626 A1* | 4/2008 | Griffin et al. | 455/575.1 |

FOREIGN PATENT DOCUMENTS

WO WO2007069234 6/2007

* cited by examiner

*Primary Examiner* — Nick Corsaro
*Assistant Examiner* — Babar Sarwar
(74) *Attorney, Agent, or Firm* — James Goepel; Michael D. Rodriguez

(57) ABSTRACT

A system for facilitating wireless communication between an accessory and a device comprising a device capable of converting at least an audio signal into a signal transmittable by a wireless communication means; a wireless communication means associated with the device capable of transmitting the converted signal; an accessory, including a docking cradle comprising a plurality of pins, wherein at least one pin on the docking cradle is capable of receiving an audio signal; and an adaptor capable of communicatively coupling with the accessory's docking cradle, the adaptor being capable of receiving the transmission from the wireless communication means associated with the device and converting the signal into an audio signal that can be received by the accessory via the docking cradle.

23 Claims, 9 Drawing Sheets

PORTABLE MEDIA PLAYER EMULATOR FOR FACILITATING WIRELESS USE OF AN ACCESSORY

FIELD OF THE INVENTION

The present invention relates to the field of portable entertainment devices, and more specifically provides a portable media player emulator through which an audio accessory can be placed in wireless communication with a portable media player or other such device, and through which an audio accessory can be used as a speakerphone accessory in wireless communication with a telephone.

BACKGROUND OF THE INVENTION

Whether integrated into other devices such as cellular telephones or digital cameras, or as stand-alone devices, portable devices that play music, video, or the like, commonly referred to as portable media players or PMP's, have become ubiquitous. Perhaps best known of these PMP's is the iPod line of products distributed by Apple Computer of Cupertino, Calif. Because of its popularity, the iPod also has one of the broadest ranges of accessories that address some of the inherent limitations of the iPod and other PMP's.

One such limitation is the fact that, to improve their portability, PMP's typically do not include any external speakers. While many users listen to music or other audio from a PMP on headphones, headphones are inherently limiting because, generally, only one person can hear the audio. Thus, many users prefer to connect their PMP's to remote speaker systems, since these remote speaker systems typically allow others to listen to the audio from the PMP.

Users connect their PMP's to an external speaker system, such as a home stereo, car stereo, or portable speaker system, via either a frequency modulation ("FM") transmitter or via a cable or direct connection. FM modulators are useful for connecting PMP's to stereo systems that are not configured to accept signals from external devices, such as car stereos or the like. Frequently, FM modulators plug into the headphone jack on the PMP (and sometimes through other connectors of the PMP such as the 30-pin connector on the iPod) and broadcast the audio signal on a traditional FM frequency at a low power level so that only devices near the PMP can receive the broadcast. The broadcast signal is received by an FM tuner in the car stereo or home stereo, which then plays the music over the associated speaker system. While such FM modulators are advantageous because they allow users to listen to PMP's on sound systems that are not configured to accept wireless input from a PMP, the FM modulators typically only broadcast on one of a few frequencies, and thus are subject to interference from other FM modulators or from local radio stations broadcasting at the same frequency or neighboring frequencies. The FM modulators also tend to introduce noise into the audio signal, and to lose some of the dynamic range of the audio signal because of limitations inherent in frequency modulation.

As a result of the limitations imposed by FM modulators, many audio enthusiasts tend to prefer to connect their PMP to remote speaker systems via a cable or by direct connection. Many cables simply have a ⅛" stereo headset plug on one end for connecting to the headphone jack on the PMP, and either an RCA, ⅛" stereo headset, or ¼" phono plug on the other for connecting to the remote speaker system. Because the cables plug into the headset jack, these cables receive an amplified signal from the PMP. This means the signal is likely to contain some amplified noise. This amplified signal, including the amplified noise, is then transmitted through the cable where it is subject to the induction of additional noise. Where, as is typical, the remote speakers include an amplifier, both the induced noise and the amplified noise can be further amplified, thus resulting in relatively poor audio quality. Direct connection is achieved by attaching a PMP to a remote speaker system via a docking port and connector, such as, without limitation, the 30-pin proprietary connector used on the Apple iPod. An exemplary remote speaker system that capable of direct connection with a PMP is the inMotion IM3 made by Altec Lansing Technologies, Inc. of Milford, Pa.

While cables and direct connections offer improved audio quality compared to the use of FM modulators, cables and direct connections are inherently proximity-limiting. That is, the PMP must remain tethered to the remote speaker system while the remote speaker system is in use. Because PMP's are easily stolen and easily left behind, many users would prefer to keep their PMP on their person or in their purse, coat, backpack, or the like, rather than having to leave the PMP on a desk, in their car, or next to their home stereo, but these users would rather not resort to FM modulators and the reduced audio quality associated therewith.

What is needed is a device that allows a PMP or other device to wirelessly communicate with remote speakers that is not subject to the same limitations as the related art.

SUMMARY OF THE INVENTION

Accordingly, the present invention is directed to a portable media player emulator for facilitating wireless use of an accessory that substantially obviates one or more of the problems due to limitations and disadvantages of the related art.

It is an object of the present invention to provide a system for facilitating wireless communication between a device and an accessory for that device, wherein the accessory includes a docking cradle and a connector including a plurality of electrical contacts, and wherein at least one electrical contact of the connector is adapted to receive an audio signal, and wherein the device is capable of generating a first signal representative of audio information, the system comprising a wireless communicator associated with the device, the wireless communicator being adapted to wirelessly transmit at least a portion of the audio information represented by the first signal, wherein the wireless communicator wirelessly transmits the at least a portion of the audio information utilizing a short range wireless data transmission technology, the short range wireless data transmission technology selected from the set consisting of Bluetooth, WiFi, Ultra-wide band, or infrared; and an adaptor configured to physically and communicatively couple with the connector of the accessory, the adaptor being adapted to wirelessly receive a transmission from the wireless communicator associated with the device, and to convert the at least a portion of the audio information into an audio signal that can be received by the at least one electrical contact of the connector, and further comprising a wireless transmitter such that the adaptor can transmit information to the device, such as, without limitation, signals from a remote control unit associated with the adaptor. Such signals may include, without limitation, audio information received by the remote control and instructions received by the remote control. The signals may be transmitted utilizing a short range wireless data transmission technology, such as, without limitation, Bluetooth, WiFi, Ultra-wide band, or infrared. It is another object of the invention to provide the above-described system wherein the wireless communicator associated with the device receives the at least a portion of the audio information transmitted by the wireless transmitter and converts the at least a portion of the audio information into audio information that can be used by the device. The device may be a portable media player, telephone, cellular telephone, or the like. The accessory may be a speaker system, video display, or the like. The system may also be equipped with one or more microphones, thereby permitting the system to function as a speaker phone system. The microphone(s) may be incorporated into the adaptor, into the device, into a remote control unit, or the like.

It is another object of the present invention to provide a method of facilitating wireless communication between a device, such as, without limitation, a portable media player, plain old telephone system ("POTS") telephone or telephone base station, cellular telephone, or the like, and an accessory, such as a speaker system, the accessory comprising a docking cradle having a docking cradle connector, the method comprising the steps of generating, on a device, a first signal representative of audio information; converting the first signal into a first wireless signal, wherein the first wireless signal is capable of being transmitted by a wireless transmitter associated with the device; transmitting the first wireless signal via the wireless transmitter using a short range wireless data transmission technology such as, without limitation, Bluetooth, WiFi, Ultra-wide band, or infrared; receiving the first wireless signal at an adaptor; converting the first wireless signal into a first audio signal, the first audio signal corresponding to the audio information represented in the first signal; providing the first audio signal from the adaptor to an accessory via the docking cradle connector associated with the accessory; receiving further audio information from an audio source, such as, without limitation, a microphone located in the adaptor, the accessory, the device, or a remote control associated with the adaptor, the accessory, or the device; converting the further audio information into a second wireless signal capable of being transmitted using a short range wireless data transmission technology such as, without limitation, Bluetooth, WiFi, Ultra-wide band, or infrared by a wireless transmitter associated with the adaptor; transmitting the second wireless signal via the wireless transmitter associated with the adaptor; receiving the second wireless signal by a wireless receiver associated with the device; and converting the second wireless signal into a second audio signal, the second audio signal corresponding to the further audio information.

It is still another object of the present invention to provide an adaptor comprising a first wireless transceiver; a first connector having a pinout, wherein the pinout is complimentary to a docking pinout of a docking connector of a docking cradle, wherein the adaptor is adapted to physically and electrically mate with the docking cradle; wherein the first wireless transceiver is adapted to transmit information to and receive information from a device comprising a device connector, the device connector having the pinout of the docking connector; wherein a second wireless transceiver associated with the device and the first wireless transceiver are both capable of bidirectional communication; and wherein the first wireless transceiver and the second wireless transceiver perform a handshake prior to commencing communication. The second wireless transceiver may be internal to or external to the device, and may communicate audio or other information with the first wireless transceiver via a local or short-range communication means, such as, without limitation, Bluetooth, WiFi, Ultra-wide band, or infrared. The adaptor may also comprise a remote unit, wherein the first wireless transceiver receives information, such as, without limitation, audio information and/or commands, from the remote unit and forwards the information to at least one of the device or the docking cradle.

It is yet another object of the present invention to provide the above-described adaptor, wherein the adaptor is configured in a first form factor, the first form factor being adapted for docking in the docking cradle, and wherein the device is configured in a second form factor, the second form factor being adapted for docking in the docking cradle. The device may also be configured in a form factor being adapted for docking in the docking cradle, and the adaptor can also be configured in the same form factor.

It is another object of the present invention to provide an adaptor for adapting an accessory speaker system to become a speakerphone system, wherein the speaker system comprises a docking cradle having a docking connector, the adaptor comprising a connector configured to connect the adaptor to the accessory speaker system, wherein the connector is of a form factor compatible with the docking connector; an adaptor housing of a form factor compatible with the docking cradle; a microphone for receiving sound; and, a bi-directional wireless communication system adapted to receive audio information from a phone call and to transmit information representative of sound received by the microphone, wherein the received audio information is provided to the accessory for playback, and wherein the information representative of a sound is used to reproduce at least a portion of the sound on the phone call. The adaptor may further comprise a processor for removing feedback information from the sound received by the microphone. The docking connector can be a 30 pin connector, such as, without limitation, the proprietary connector used by the Apple iPod.

It is still another object to provide the above-described adaptor for use with a phone call handled by a telephone, wherein the telephone is selected from the set of: a Voice over Internet Protocol ("VOIP") system, a cell phone, or a POTS telephone. In an embodiment, the wireless communication system utilizes Bluetooth, and the phone call is handled by a POTS telephone base comprising a Bluetooth transceiver for local transmission and/or reception ("tranception") of the audio information from the phone call. In an embodiment, wherein the wireless communication system utilizes Bluetooth, and the phone call is handled by a cellular telephone comprising a Bluetooth transceiver for local tranception of the audio information from the phone call.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of at least one embodiment of the invention.

In the drawings.

DETAILED DESCRIPTION

Reference will now be made in detail to embodiments of the present invention, examples of which are illustrated in the accompanying drawings.

Figure 1:
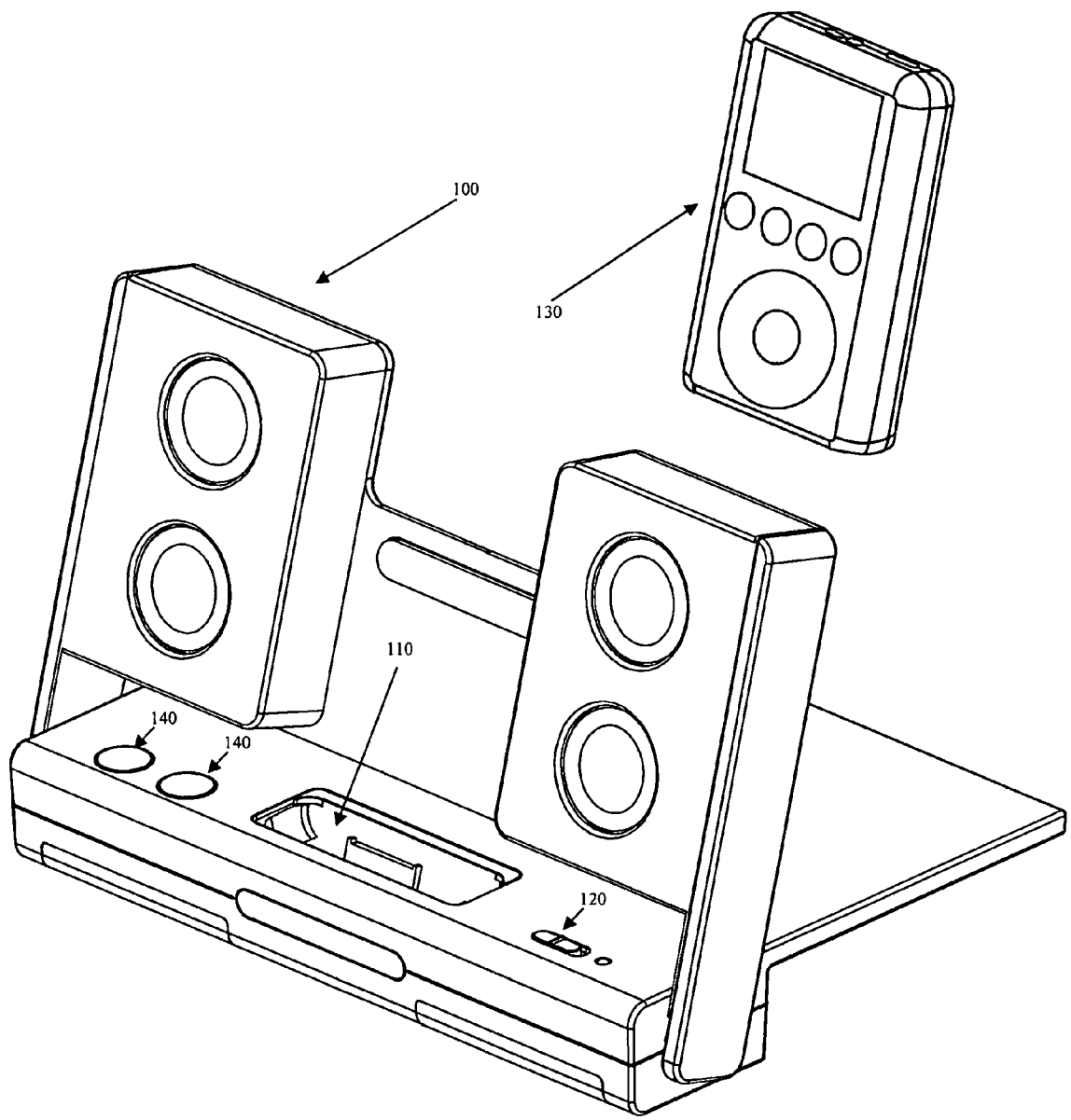
FIG. 1 is a top perspective view of a prior art PMP and accessory, including a docking cradle.

FIG. 1 is a top perspective view of a prior art PMP 130 and accessory 100. Although FIG. 1 reflects an Apple iPod as the PMP and an Altec Lansing IM3 as the accessory, this is done by way of example, and not by way of limitation. In FIG. 1, accessory 100 includes a docking cradle 110 which is capable of receiving PMP 130 or another such device. When PMP 130 is physically coupled to, or mated with, docking cradle 110 and power switch 120 is in the "on" position, accessory 100 can receive input from PMP 130 and can send information to PMP 130 because the pinout of docking cradle 110 and the corresponding connector on PMP 130 (not shown) are complimentary. By way of example, without intending to limit the present invention, docking cradle 110 may receive line level audio output and video output from PMP 130. Docking cradle 110 may also send data to PMP 130, such as, but not limited to, start/stop/pause/fast forward/rewind and other such commands from control buttons 140, and data from external sources, such as one or more remote control units or computers communicatively coupled to accessory 100. It should be apparent to one skilled in the art that although accessory 100 is illustrated as a speaker system in FIG. 1, alternative accessories, such as, without limitation, a video display, can be substituted therefor without departing from the spirit or the scope of the present invention.

Figure 2:
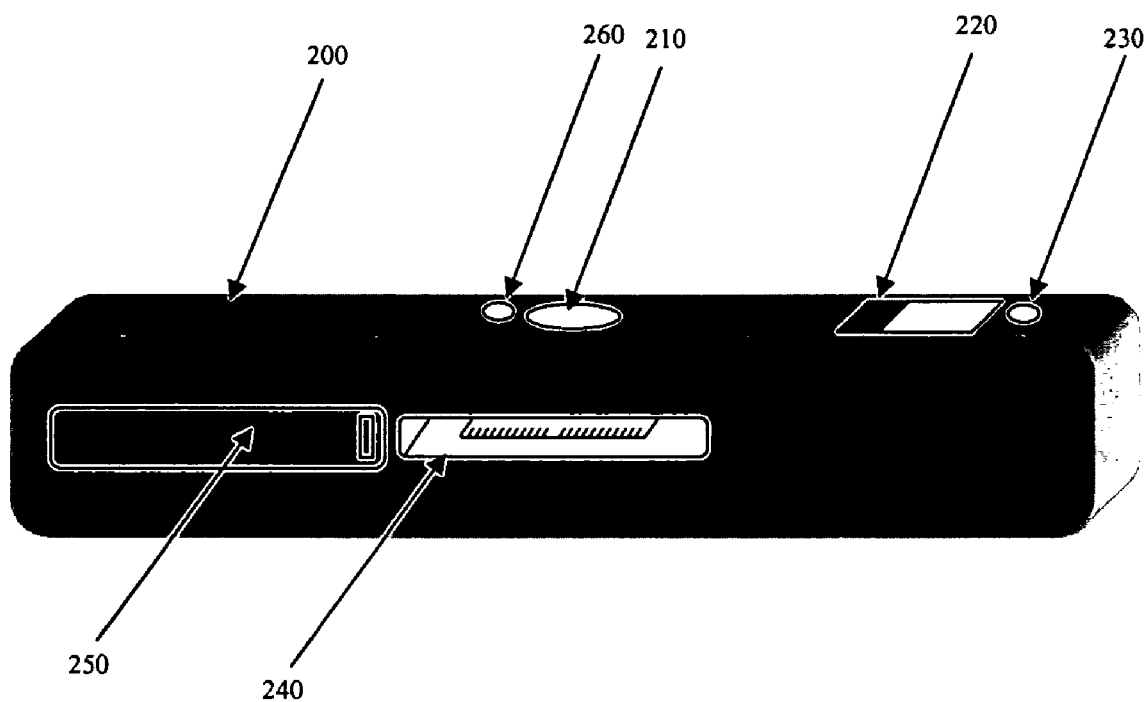
FIG. 2 is a bottom perspective view of an exemplary adaptor for mating with the docking cradle illustrated in FIG. 1.

FIG. 2 is a bottom perspective view of an embodiment of adaptor 200. Because the pinout of connector 240 is complimentary with the pinout of docking cradle 110 of FIG. 1, and because the size, or form factor, of adaptor 200 is compatible with docking cradle 110, adaptor 200 can electrically and mechanically mate with docking cradle 110. Adaptor 200 comprises a wireless communication facility (not shown) that permits other devices (not shown) with compatible wireless facilities or adaptors providing such facilities to communicate wirelessly with accessory 100.

Figure 3:
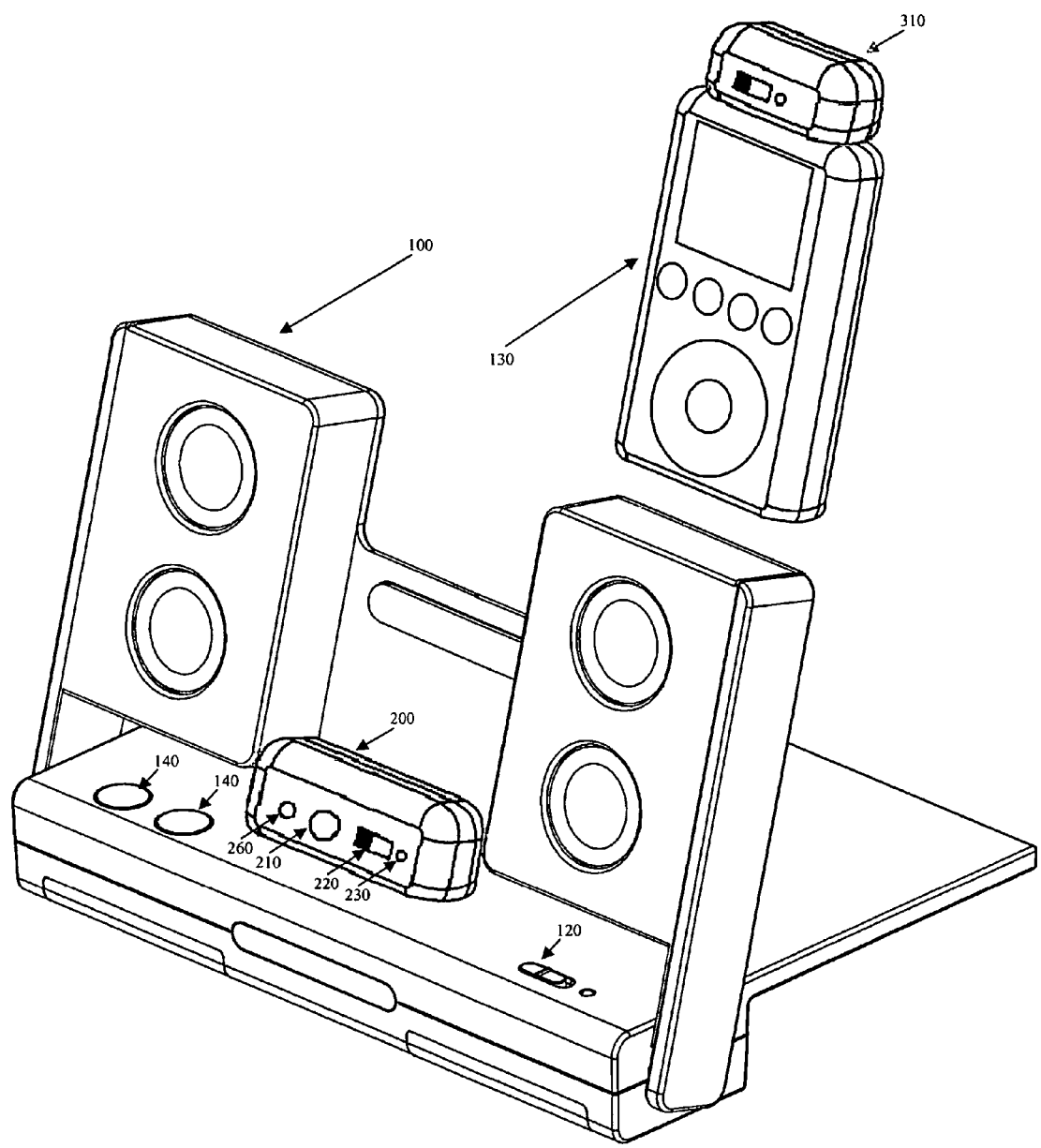
FIG. 3 is a top perspective view of a prior art PMP and accessory, including wireless adaptors for both the PMP and the accessory.

FIG. 3 illustrates an embodiment in which device 310 is communicatively coupled to PMP 130, thereby facilitating wireless communication by PMP 130. Device 310 utilizes a standard wireless communication technology, such as, without limitation, Bluetooth, one of the Institute for Electrical and Electronics Engineers Standards Nos. 802.11, commonly referred to as "WiFi", infrared, or ultra-wide band.

Figure 4:
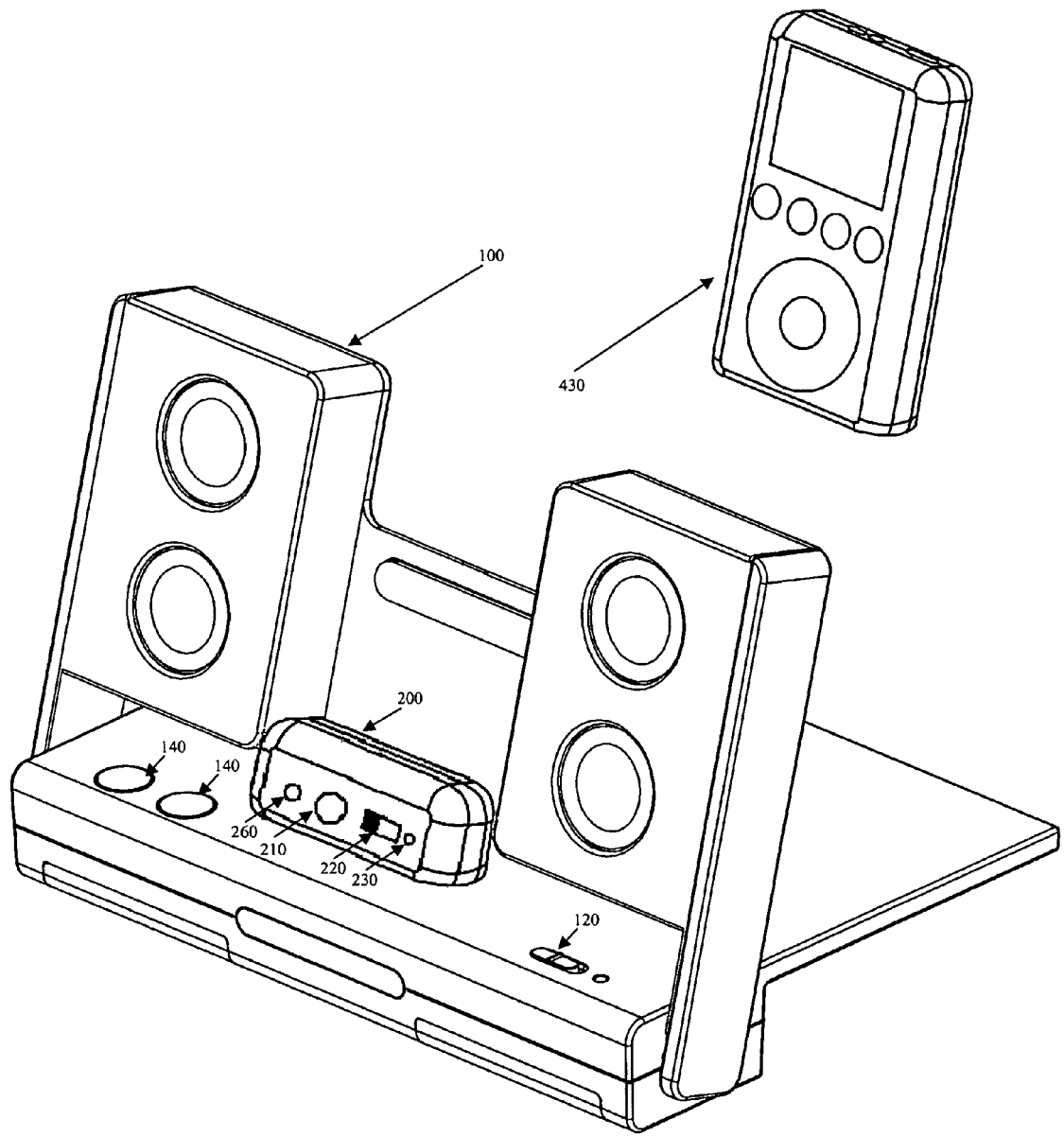
FIG. 4 is a top perspective view of a prior art accessory, including a wireless capable PMP and a wireless adaptor for the accessory.

FIG. 4 illustrates an embodiment in which PMP 430 is equipped with a Blutonium single chip Bluetooth transceiver manufactured by Broadcom, Inc. of Irvine, Calif., thereby facilitating wireless communication by PMP 130 without the need for an add-on device.

Referring again to FIG. 2, adaptor 200 is capable of wireless communication using at least the same standard wireless communication technology as PMP 430 or add-on device 310. Adaptor 200 may be capable of wireless communication using a plurality of wireless communication technologies, thereby facilitating wireless communication with a wide range of devices.

In an embodiment, adaptor 200 is capable of sending signals to a PMP and reproducing at least a subset of the plurality of inputs a PMP traditionally provides to docking connector 110 when the PMP is electrically coupled thereto. Adaptor 200 thereby obviates the need for a PMP to be electrically coupled with docking connector 110.

In an embodiment, adaptor 200 can receive power from docking cradle 110 of accessory 100. In this embodiment, power to adaptor 200 is controlled by power switch 120.

In an embodiment, adaptor 200 may draw power from one or more batteries stored in battery compartment 250. Permitting adaptor 200 to supply its own power, rather than drawing power from accessory 100, can extend the battery life associated with accessory 100. In addition, providing adaptor 200 with its own power source allows for the use of one or more batteries having characteristics that more closely match the needs of adaptor 200. In an embodiment, the battery stored in battery compartment 250 may be a rechargeable battery. In an embodiment, much like an iPod, the adaptor may be provided with an internal rechargeable batter that has no external access.

Adaptor 200 may include power switch 220 for activating one or more of its electrical features, such as the wireless communications of the adaptor 200. In an embodiment, adaptor 200 includes a power indicator 230. Power indicator 230 may be, e.g., a light emitting diode ("LED") or an LCD display. In an embodiment, power indicator 230 can indicate the state of power switch 220 (e.g., on/off) and the state of the battery. In an embodiment, changing power switch 220 from off to on may cause power indicator 230 to begin emitting light (e.g. green light), thereby indicating that adaptor 200 is operational and that the batteries, if used, are functioning normally. When available battery power drops below a pre-defined range (e.g., 10%), power indicator 230 may emit a different color of light (e.g., yellow light), thereby alerting the user that the batteries should be recharged or replaced. In an embodiment, and without intending to limit the invention, the power indicator 230 may comprise an LED that is green when adaptor 200 is on and the battery is fully charged, yellow when adaptor 200 is on and the battery is partially charged, and red when the adaptor 200 is on but the battery is low.

Figure 5:
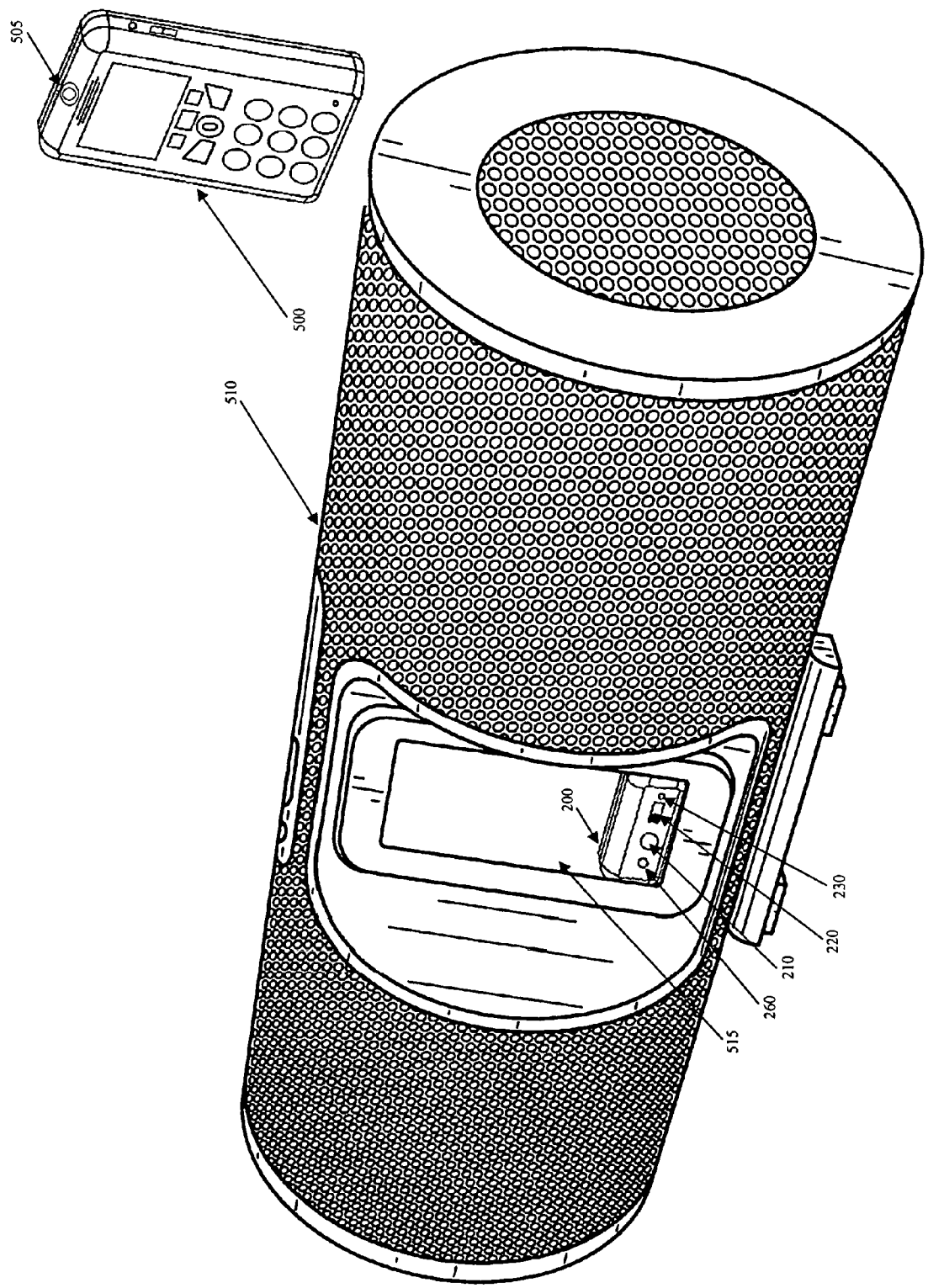
FIG. 5 is a front perspective view of a prior art accessory and wireless capable cellular telephone, including a wireless adaptor for the accessory.

One advantage of adaptor 200 is that, where a standardized wireless communications technology, such as Bluetooth, WiFi, Ultra-wide band, or infrared, is used, adaptor 200 can allow accessory 100 to operate with a plurality of devices. Many devices, including PMP's, utilize device-specific docking cradle and connector configurations, thus an accessory designed for one device cannot typically physically or electrically couple to, or mate with, another device. This is further illustrated in FIG. 5. Device 500 of FIG. 5 is illustrated as an inMotion IM7, manufactured by Altec Lansing Technologies, Inc. of Milford, Pa. Docking cradle 515 of the inMotion IM7 is configured to receive an Apple iPod via the proprietary 30-pin connector associated with the iPod. This configuration prevents Accessory 510 from physically communicating with another device, such as Bluetooth-enabled cellular telephone 500.

By equipping accessory 510 with adaptor 200, accessory 510 is capable of communicating with a plurality of device types. Thus, where adaptor 200 is a Bluetooth enabled adaptor, adaptor 200 can permit accessory 510 to pair with, and then communicate with, any Bluetooth enabled device, including, without limitation, mobile telephones, laptop computers, PMP's, and the like. Such pairing may be facilitated by device 500 and adaptor 200 performing a "handshake", wherein each identifies itself to the other and a user authorizes device 500 and adaptor 200 to communicate. Such authorization may include the entry of an authorization code into one or both of device 500 and adaptor 200.

Where accessory 510 is a speaker system, the speaker system can thus be used to reproduce audio received wirelessly from a Bluetooth enabled device. Although adaptor 200 is illustrated in FIG. 5 as having a much smaller form factor than the PMP it emulates, alternative adaptor form factors can be substituted therefor without departing from the spirit or the scope of the invention. By way of example, without intending to limit the present invention, adaptor 200 may be of a size and shape similar to that of the PMP emulated by adaptor 200.

Referring again to FIG. 2, adaptor 200 may comprise a microphone 210 for receiving sound in the proximity of the microphone. The audio output of the microphone can be wirelessly transmitted by adaptor 200 to a cell phone, PMP, portable desktop assistant ("PDA"), laptop, or other wirelessly-enabled device. Similarly, the audio portion, or other acoustic information, of a phone call can be received by adaptor 200 and provided to accessory 100. Accessory 200 can thereby permit the combination of microphone 210 and accessory 100 to act as a speakerphone for a Bluetooth-enabled cellular or landline telephone, or as a speakerphone for a voice over Internet Protocol ("VOIP") call on a Bluetooth-enabled PDA, laptop, or the like. In an embodiment, input from a microphone associated with device 130 may be substituted for the input from microphone 210 or combined therewith. By way of example, without intending to limit the present invention, the microphone associated with device 130 may be integrated into device 130 or coupled thereto, such as a microphone integrated into an adaptor which enables device 130 to communicate via Bluetooth.

In an embodiment, a microphone (not shown) may be integrated into accessory 100, and the audio signal associated therewith can be provided to adaptor 200 via docking cradle 110. In an embodiment, a switch or automatic switching circuit may be used to select between operation as a speakerphone and operation for reproduction of, e.g., sound or video from a PMP. Thus, where the device is a telephone and accessory 100 includes one or more speakers, adaptor 200 can permit accessory 100 to function as a speakerphone. Where, as in FIG. 5, the device with which adaptor 200 is communicating is a cellular telephone or other communications device equipped with a camera 505, adaptor 200 can facilitate video conferencing between the participants in a call.

In an embodiment, adaptor 200 may comprise a mute button 260. Mute button 260 can be used to temporarily mute microphone 210. When microphone 210 is muted, power indicator 230 may emit a signal, such as by flashing power indicator 230, thereby indicating the mute status.

As is well known in the art, because the microphone is so closely coupled with the acoustic output of the speakerphone, feedback can become an issue. In one embodiment, the audio output being delivered to the speakers is removed from the microphone's output, thereby reducing or eliminating feedback.

In an embodiment, a Bluetooth-enabled phone, phone base, or handset transmits its audio output to adaptor 200 via a wireless Bluetooth connection and receives the output from microphone 210 (less any feedback reduction) over the same connection. Adaptor 200 sends the audio output to accessory 100 which, in turn, reproduces the audio output over its speakers. In this manner, a speakerphone is provided.

Figure 6:
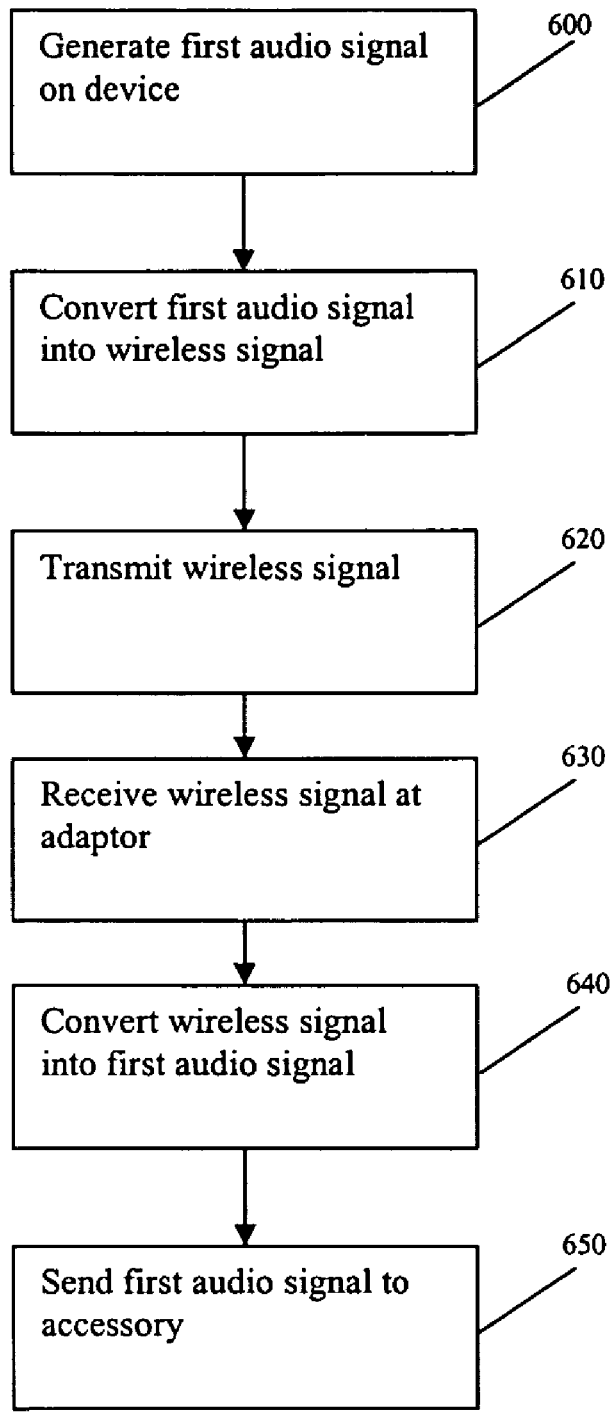
FIG. 6 is a process flow diagram illustrating a method through which audio information can be transmitted from a device to an accessory via an adaptor.

FIG. 6 is a process flow diagram illustrating a method through which audio information can be transmitted from a device, such as PMP 130, to accessory 100 via adaptor 200. In an embodiment, a first audio signal is generated on the device (Block 600), which is then converted into a signal that can be transmitted via a wireless technology (Block 610). The converted signal is then transmitted (Block 620) to adaptor 200 (Block 630), where it is converted back into an audio signal (Block 640). Adaptor 200 then sends the audio signal to accessory 100 via docking cradle 110 (Block 650).

Figure 7:
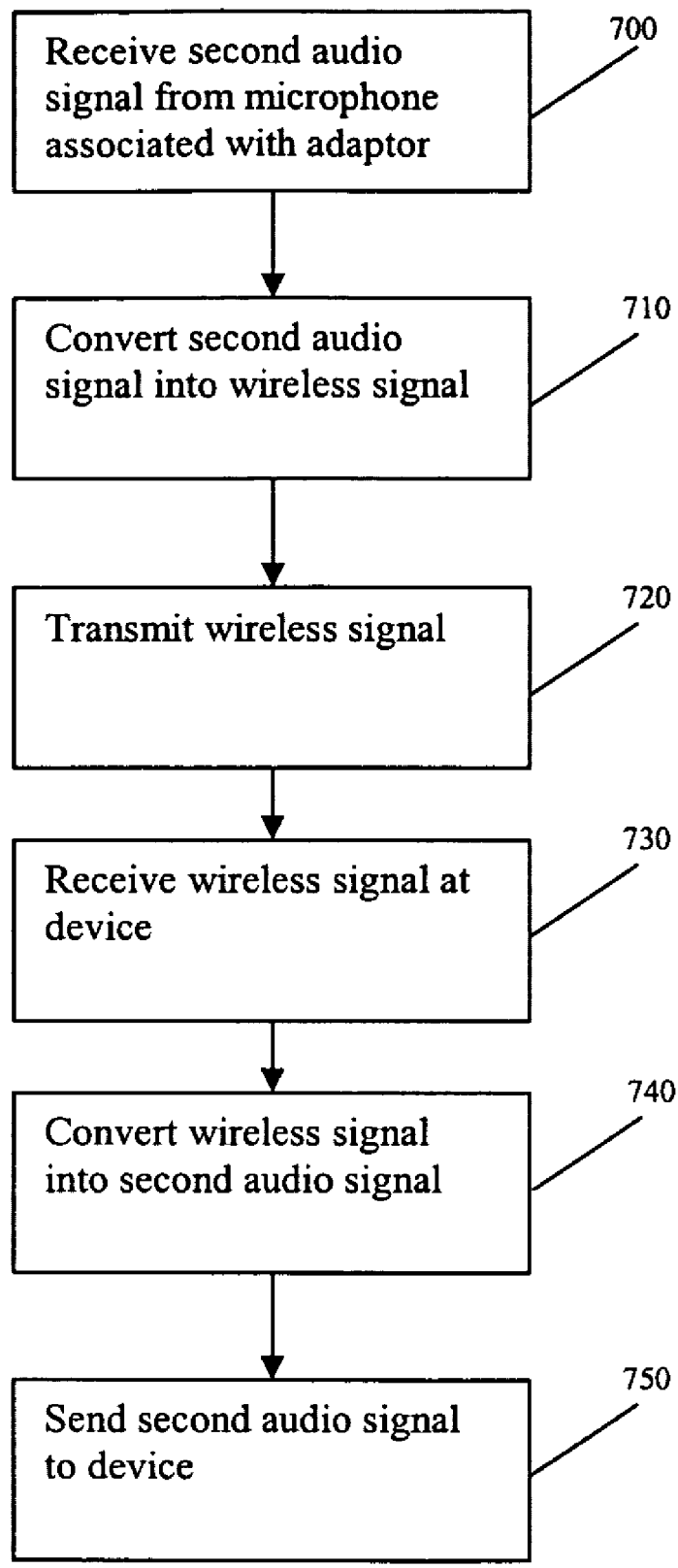
FIG. 7 is a process flow diagram illustrating a method through which audio information can be transmitted from an accessory to a device via an adaptor.

FIG. 7 is a process flow diagram illustrating a method through which audio information can be transmitted from accessory 200 to a device, such as PMP 130, via an adaptor. In Block 700, a first audio signal is generated on adaptor 200, such as via microphone 210, which is then converted into a signal that can be transmitted via a wireless technology (Block 710). The converted signal is then transmitted (Block 720) to the device (Block 730), where it is converted back into an audio signal (Block 740). The device then processes this audio signal (Block 750).

Figure 8:
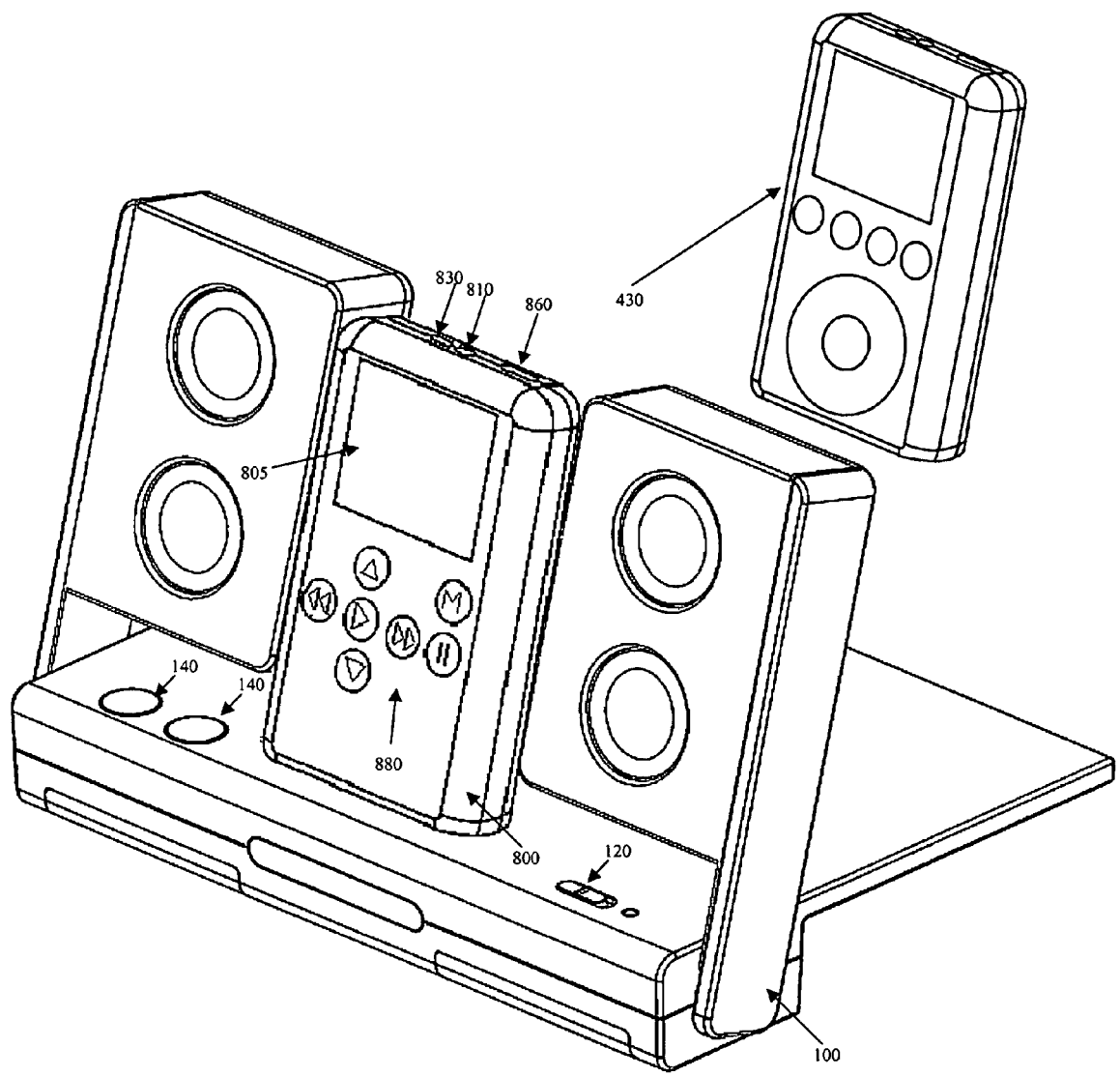
FIG. 8 is a front perspective view of a prior art accessory and wireless capable PMP and a wireless adaptor for the accessory.

FIG. 8 illustrates an embodiment in which adaptor 800 is a form factor similar to that of PMP 430 with which accessory 100 is designed to mate. Adaptor 800 may contain controls similar to that of adaptor 200 of FIG. 2, including, without limitation, mute button 860, microphone 810, and power indicator 830. Because adaptor 800 has a larger form factor than adaptor 200 of FIG. 2, adaptor 800 can also include additional user interface elements, including additional playback controls 880 and display screen 805. Display screen 805 can allow adaptor 800 to display text and/or video from PMP 430. By way of example, without intending to limit the present invention, display screen 805 may allow a user to review and select from playlists stored on or accessible by PMP 430, and may display video information stored on or accessible by PMP 430. As a user interacts with playback controls 880, the changes indicated thereby can be sent to either accessory 100 or PMP 430, as appropriate. Such changes may include, without limitation, increasing or decreasing the volume, fast forwarding, rewinding, or pausing playback of audio or video currently being presented, and selecting new video or audio content to be presented.

Figure 9:
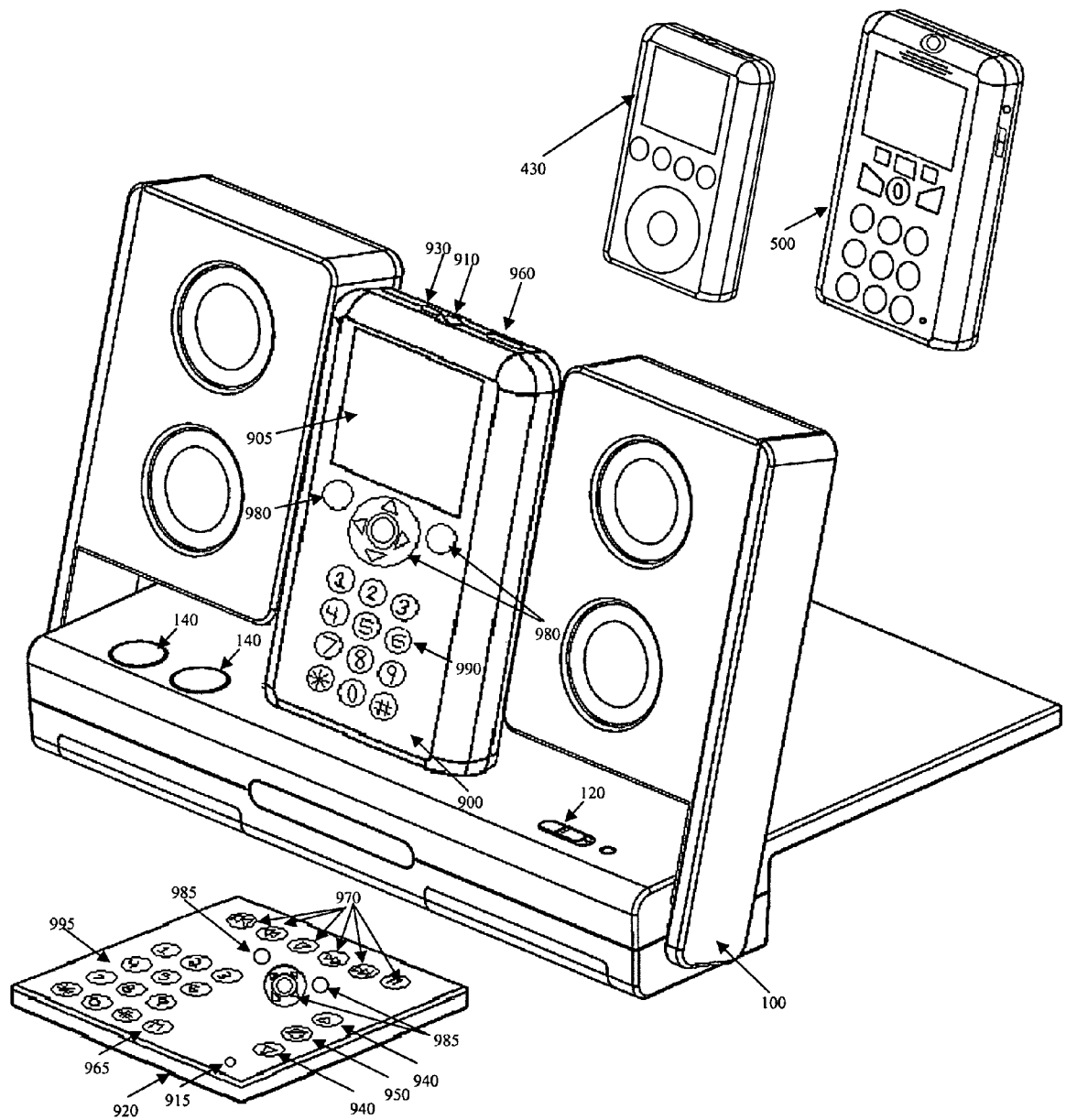
FIG. 9 is a front perspective view of a prior art accessory, wireless capable cellular telephone, and wireless capable PMP, including a wireless adaptor for the accessory and a remote control.

FIG. 9 illustrates an embodiment in which adaptor 900 is of a form factor similar to that of PMP 430 with which accessory 100 is designed to mate, but wherein adaptor 900 is capable of additional features beyond those associated with PMP 430. Adaptor 900 is capable of pairing with both PMP 430 and cellular telephone 500, and as a result, adaptor 900 includes number keys 990 which a user can use to initiate a telephone call using cellular telephone 500. Display screen 905 allows adaptor 900 to display text and/or video information received from either of PMP 430 or cellular telephone 500. Adaptor 900 may also include navigation user interface elements 980 which permit the user to control various functions associated with both PMP 430 and cellular telephone 500. Adaptor 900 may also include mute button 960, microphone 910, and power indicator 930. Although illustrated as separate buttons, some or all of user interface elements 990, navigation buttons 980, mute button 960, and power indicator 930 may alternatively be implemented as part of a touch-sensitive display.

An embodiment may also include a remote control 920. Such a remote control can allow the user to send commands or other information to adaptor 900 without being physically proximate to adaptor 900. The remote control can include user interface elements for selecting a device with which adaptor 900 is paired, buttons 995 for entering a phone number or other alphanumeric information, playback controls 970, navigation controls 985, volume controls 940, and audio output mute button 950. The remote control may further include a microphone 915, thereby allowing the user to more discretely carry on a hands-free conversation. Microphone mute button 965 can allow the user to temporarily disable the microphone on at least one of remote control 920 or adaptor 900 without ending the call. Audio signals received by adaptor 900 from microphone 915 can be rebroadcast to cellular telephone 500 or PMP 430, or the received audio signals may be rebroadcast to accessory 100. In this later embodiment, remote control 920 can be used for karaoke or to otherwise sing along with a song, or to narrate a presentation.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. An adaptor comprising:
a first wireless transceiver;
a first connector having a pinout, wherein the pinout is complimentary to a docking pinout of a docking connector of a docking cradle,
wherein the adaptor is adapted to physically and electrically mate with the docking cradle; and
wherein the first wireless transceiver is adapted to transmit information to and receive information from a device comprising a device connector, the device connector having the pinout that is complimentary to the docking pinout of the docking connector.

2. The adaptor of claim 1, wherein a second wireless transceiver associated with the device and the first wireless transceiver are both capable of bidirectional communication.

3. The adaptor of claim 2, wherein the second wireless transceiver is external to and electrically connected to the device.

4. The adaptor of claim 2, wherein the first wireless transceiver and the second wireless transceiver perform a handshake prior to commencing communication.

5. The adaptor of claim 2, wherein the first wireless transceiver and the second wireless transceiver communicate via a local communication means.

6. The adaptor of claim 2, wherein the bidirectional communication comprises audio information.

7. The adaptor of claim 1, further comprising a remote unit.

8. The adaptor of claim 7, wherein the first wireless transceiver receives information from the remote unit and forwards the information to at least one of the device or the docking cradle.

9. The adaptor of claim 8, wherein the information comprises commands.

10. The adaptor of claim 8, wherein the information comprises audio information.

11. The adaptor of claim 1, wherein the adaptor is configured in a first form factor, the first form factor being adapted for docking in the docking cradle, and wherein the device is configured in a second form factor, the second faun factor being adapted for docking in the docking cradle.

12. The adaptor of claim 1, wherein the device is configured in a form factor being adapted for docking in the docking cradle, and wherein the adaptor is also configured in the form factor.

13. An adaptor for adapting an accessory speaker system to become a speakerphone system, wherein the speaker system comprises a docking cradle having a docking connector that is compatible with a docking connector of a portable audio player, the adaptor comprising: a connector configured to connect the adaptor to the accessory speaker system, wherein the connector is of a form factor compatible with the docking connector; an adaptor housing of a form factor compatible with the docking cradle; a microphone for receiving sound; and, a bi-directional wireless communication system adapted to wirelessly receive audio information relating to a phone call from a wirelessly-enabled device comprising a device connector, the device connector having the pinout that is complimentary to a docking pinout of the docking connector, and to wirelessly transmit information representative of sound received by the microphone to the wirelessly-enabled device.

14. The adaptor of claim 13, wherein the received audio information is provided to the accessory for playback.

15. The adaptor of claim 13 wherein the information representative of a sound is used to reproduce at least a portion of the sound on the phone call.

16. The adaptor of claim 13, further comprising a processor for removing feedback information from the sound received by the microphone.

17. The adaptor of claim 13, wherein the wireless communication system consists of at least one selected from the set of: Bluetooth, WiFi, Ultra-wide band, or infrared.

18. The adaptor of claim 13, wherein the connector is a 30 pin connector.

19. The adaptor of claim 18, wherein the 30 pin connector is the proprietary connector used by the Apple iPod.

20. The adaptor of claim 13, wherein the phone call is handled by a telephone, and the telephone is selected from the set of: a VOIP system, a cell phone, or a POTS telephone.

21. The adaptor of claim 20, wherein the wireless communication system utilizes at least one selected from the set: of Bluetooth, WiFi, ultra-wide band, or infrared.

22. The adaptor of claim 13, wherein the wireless communication system utilizes Bluetooth, and wherein the phone call is handled by a POTS telephone base comprising a Bluetooth transceiver for local tranception of the audio information from the phone call.

23. The adaptor of claim 13, wherein the wireless communication system utilizes Bluetooth, and wherein the phone call is handled by a cellular telephone comprising a Bluetooth transceiver for local tranception of the audio information from the phone call.

* * * * *